United States Patent [19]

Keller et al.

[11] 4,247,877
[45] Jan. 27, 1981

[54] HEAD LOADING CARRIAGE ASSEMBLY FOR A FLOPPY DISK DRIVE

[75] Inventors: Jacob P. Keller, Buena Park; Lawrence W. Fay, El Toro, both of Calif.

[73] Assignee: Siemens Corporation, Iselin, N.J.

[21] Appl. No.: 64,064

[22] Filed: Aug. 6, 1979

[51] Int. Cl.³ .......................... G11B 5/48; G11B 5/58
[52] U.S. Cl. .................................. 360/105; 360/104; 360/109; 360/128; 360/130.34
[58] Field of Search ................ 360/104, 103, 105–106, 360/109, 130.3, 133, 99, 130.34, 128

[56] References Cited

U.S. PATENT DOCUMENTS

| | | | |
|---|---|---|---|
| 4,151,573 | 4/1979 | Tandon et al. | 360/104 |
| 4,167,766 | 9/1979 | Chau | 360/104 |

OTHER PUBLICATIONS

IBM-TDB vol. 21, No. 3, Aug. 1978, p. 1223, "Multiple Load Suspension for Magnetic Heads" by McDonald.

*Primary Examiner*—John H. Wolff
*Attorney, Agent, or Firm*—Spellman, Joel & Pelton

[57] ABSTRACT

There is disclosed a head loading carriage assembly for a data storage device such as a "floppy" disk device, the carriage assembly including a base and being movable in a radial direction relative to the recording medium. Pivoted with respect to this base are two arms: a head support arm carrying at least one magnetic head and an auxiliary load arm which is movable in respect to the head support arm between a first and a second load position. The magnetic head is in contact with the recording medium in both of these load positions; however, it is operative only in the first load position. A first spring urges the auxiliary load arm into the first load position towards the head support arm, so as to engage the magnetic head attached to this arm with the recording medium. A second spring, forming a residual leaf spring, is arranged between the head support arm and the auxiliary load arm. This second spring is operative in the second load position to apply a force to the head support arm that is less than that of the auxiliary load arm in its first position.

12 Claims, 3 Drawing Figures

HEAD LOADING CARRIAGE ASSEMBLY FOR A FLOPPY DISK DRIVE

BACKGROUND OF THE INVENTION

The present invention is directed to magnetic storage devices and in particular to a magnetic head loading assembly being pivoted to a carriage, said carriage being movable arranged in a radial direction with respect to a rotatable flexible magnetic medium.

Early magnetic storage devices for data processing systems made use of contact recording. This recording method was superceded to some extent after development of a bearing magnetic head with low mass expecially for mass storage devices, such as the magnetic disk storage device. With this improved type of head loading assembly the magnetic head is spaced away from the magnetic surface even during recording operations; i.e., the magnetic head is allowed to "fly" on a thin air layer over the recording medium so as to permit intimate interaction between the transducer and the magnetic surface. Contact recording has been used continuously, on the other hand, particularly with multi-channel devices, such as magnetic tape devices.

With rotatable magnetic storage media the head loading techniques were changed again when the so-called "floppy" disk systems were developed. In such storage systems, a thin flexible magnetic disk is used as storage medium in combination with low cost accessing, transducing and control apparatus. The low costs of this kind of storage devices have resulted in a widespread use for program storage, entry and control applications.

In the original floppy disk systems, the transducer structure generally comprises a single channel magnetic head having a contact surface. This contact surface is formed as a segment of a spheroid or at least in a curved shape. The transducer is mounted on a moveable carriage that is accessed to different circumferential tracks on the floppy disk. On the opposite side of the disk, and also in contact with the disk, is a pressure pad mounted adjacent to the end of a spring-loaded arm, which is solenoid-controllable so as to be free to exert pressure when data transfer operations are to take place.

Recently, however, floppy disk devices have been developed wherein both sides of the floppy disk are used for data transfer operations, the purpose primarily being to increase the storage capacity. Thus only a single low speed accessing mechanism continues to be employed. The magnetic heads are arranged on opposite sides of the flexible magnetic medium in a generally opposed relationship, with only a slight offset in the head gaps to avoid flux interaction.

As mentioned above, floppy disk storage devices are intended for a widespread use in a variety of applications due to their low cost. Therefore, it has been the main object with floppy disk storage devices, here more than with other storage devices, to achieve simple structures of high reliability for head loading carriage assemblies with sufficiently low access times and high storage capacity.

Present floppy disk manufacturers are using three approaches to double sided contact recording operations. One of these approaches is known from the U.S. Pat. No. 4,089,029 to Castrodale et al. With this type of magnetic recording device, in which a pair of transducers contact opposite faces of the recording medium, each of the transducers is mounted on a relatively weak gimbal spring. Relatively rigid load arms bear on dimples located at the centers of the transducers to form universal joint connections with the transducers. The load arms are mounted on relatively stiff gimbal spring portions for applying a predetermined force to the transducers. This known structure with the gimbal spring and universal joint connections allows the transducers to pitch and throw with wobbling movements of the recording medium. This is an effective solution in respect to accessing times and storage capacity. However, it is expensive and sensitive to adjustment.

Another magnetic recording device for double sided media is described in the U.S. Pat. No. 4,151,573 to Tandon et al. This device uses a fixed transducer on one side of the recording medium and a movable transducer element on the opposite side. The movable transducer is gimballed on a pivoted spring-loaded arm of low mass and high stiffness to urge the recording medium against the fixed transducer with a light force. The force is adequate, together with a slight penetration of the fixed transducer into the plane of the recording medium, to correct the deflections of the recording surface in a direction normal to the plane surface of the recording medium. It is suggested that the transducers are maintained in operative relation for maximum flux interchange, but without introducing undue wear or requiring a long head settling time. This known device has a simpler structure than the device mentioned above, but in both devices the magnetic transducers are in a loading position even if they are not operative, i.e. not in a recording or reproducing status.

Another known disk type magnetic recording system is described in the U.S. Pat. No. 3,814,441 to Craggs. This system employs apparatus for swinging the recording arm into position with the magnetic transducer centered within a given track and a stepping motor for stepping the transducer from track to track. The system also includes a safety lifting device which is provided for preventing excessive wear of any one track. The safety lifting device is under the control of a solenoid which, in turn, is energized through a timer. This timer is set when any of several operating controls are activated and reset after a predetermined period of time. By resetting the timer the solenoid is de-energized and the recording arm is released automatically. This is accomplished by a load spring which works against the solenoid so that there is always a positive arm lifting movement providing a fail-safe operation. By this fail-safe operation undue wear is totally avoided, but, on the other hand, this system requires long head settling times.

SUMMARY OF THE INVENTION

It is, therefore, a general object of the present invention to provide an improved head loading carriage assembly.

It is another object of the invention to provide an assembly as above with reduced mass and a very simple structure which is suitable either for one sided or double sided contact recording.

It is another object of the invention to provide an assembly which avoids undue wear on any track of the recording medium which could result from prolonged repetitive contact of the magnetic head on one track in a non-operative status.

In the present invention a magnetic head is maintained in an operative relation without introducing undue wear or requiring long head settling time by using an auxiliary load arm in addition to the head support arm. Both arms are pivoted with respect to a carriage base. The auxiliary load arm is movable in a direction normal to the plane of the recording medium between two load positions. In a first load position a helical load spring urges the auxiliary load arm towards the head support arm to engage the magnetic head attached to the head support arm with the recording medium. In the second load position the auxiliary load arm is lifted by control means, i.e. a de-energized solenoid. The above-mentioned load spring is not effective in this second position; nevertheless, the head support arm and the attached magnetic head are still urged toward the recording medium. This is accomplished by a residual leaf spring which is still operative in the second load position. This results in a force on the head support arm less than that of the auxiliary load arm in its first load position. Thus, the head support arm remains almost stationary in both load positions but is urged against the surface of the recording medium with different forces in any of both positions. The residual leaf spring applies such a small load to the head support arm as to resist any reverse bias forces induced by the attachment of the head support arm to the carriage base of a head cable.

BRIEF DESCRIPTION OF THE DRAWINGS

A better understanding of the invention may be had by reference to the following description of a preferred embodiment in conjunction with the accompanying drawings, in which.

DESCRIPTION OF THE PREFERRED EMBODIMENT

Figures 1, 2:
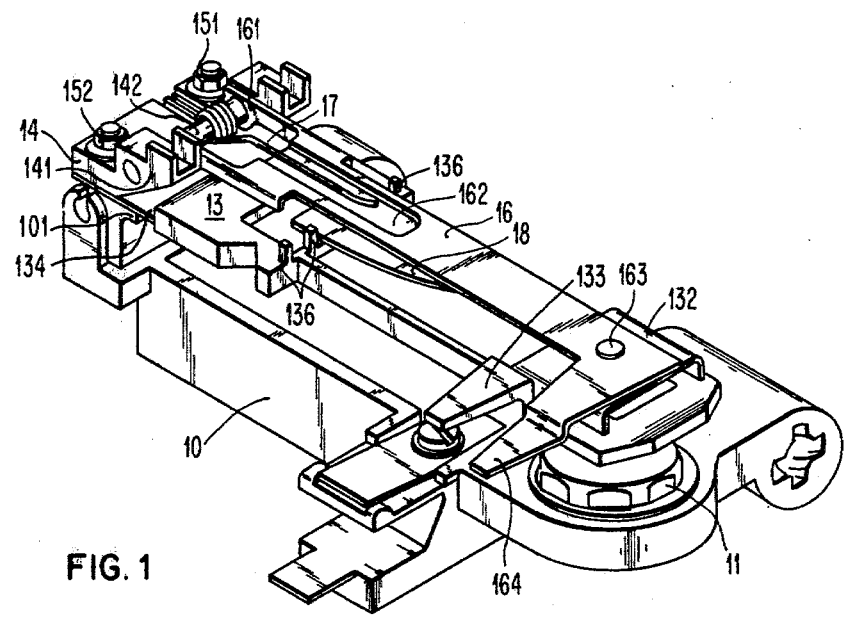
FIG. 1 is a perspective view of a head loading carriage assembly for a floppy disk system including a carriage base, the base carrying a fixed mounted lower magnetic head, a main support arm for an upper magnetic head and an auxiliary load arm pivoted with respect to the carriage base.
FIG. 2 is a side view of the arrangement of FIG. 1.

The preferred embodiment of the invention will now be described with reference to FIGS. 1–3.

In as much as floppy disk storage devices are widely used, only such parts are shown which directly belong to a head loading carriage assembly for the reason of brevity and simplicity. Reference may be made to the aforementioned U.S. patents, especially to the U.S. Pat. No. 4,151,573 as well as to other patents for details of such features as the accessing mechanism and means for inserting, or ejecting respectively the flexible, rotatable magnetic recording medium: a "floppy" disk which is also not shown. Adjacent the free end of the carriage base 10 is mounted what is referred to as a fixed transducer 11, which may, for example, be of the type known as "button head" transducer. Other types of transducers may be utilized in as much as a number of types are used with floppy disk systems, but they typically have a convex surface facing the recording medium. Button head transducers generally employ a read/write head for a single track and adjacent trim erase heads, which are well known and need not be described in detail. The fixed transducer 11 is arranged to penetrate or intercept the plane of the recording medium slightly. As shown, a typical transducer of this type has a rounded top for contact with the recording medium, forming a flat apex portion 111. Preferably the head surface is first shaped flat and a spheroidal convex rim is then formed to blend or smooth the intersection between the flat and curved surfaces so as to minimize wear.

Figure 3:
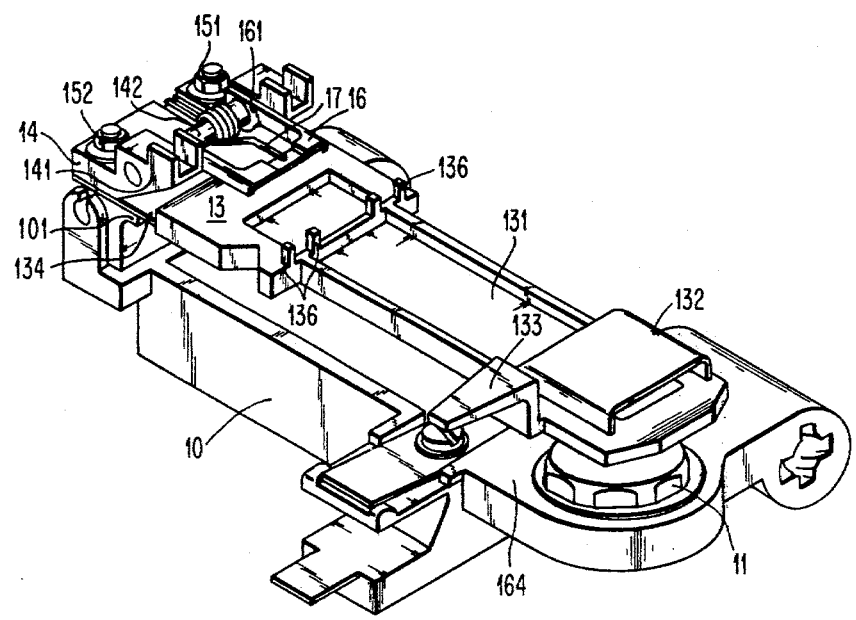
FIG. 3 is another perspective view of the assembly of FIG. 1, where several parts relating to the auxiliary load arm have been omitted for better illustration.

At the end of the carriage base 10, spaced apart from the fixed transducer 11, is pivotally mounted a low mass relatively stiff main head support arm 13, as is best seen in FIG. 3. This head support arm 13 has a thinned center section 131 along its length for purposes of reducing weight without reducing rigidity. Adjacent the free end of the head support arm 13 a housing is provided forming a head shield 132 for an upper magnetic head 12. A small aperture (not shown) in the support arm 13 facing the fixed lower magnetic head 11 is also provided within which the upper gimballed magnetic head 12 and associated energizing coils are co-extensively disposed. Also, adjacent to the free end of the head support arm 13 a landing control tab 133 is extending from one side of the head support arm 13. This control tab 133 is engageable by first control means 191 e.g. a solenoid operated element shown in FIG. 2 to permit automatic pivoting of the head support arm 13 away from the fixed lower magnetic head 11 into an unloaded position or to release the head support arm 13 to permit engagement for "landing" of the magnetic head 12 on the recording medium. This load position of the head support arm 13 is shown in the drawings.

The other end of the head support arm 13 is coupled to the adjacent end of the carriage base 10 by a pivot hinge spring 134 which permits pivoting movements away from the fixed lower magnetic head 11. The hinge spring 134 engages a head load stop 101 at one position, as seen in the drawings, to define the limit for movement in the direction toward the fixed magnetic head 11.

The hinge spring 134 is sandwiched between the head load stop 101 and a bearing block 14. This bearing block 14 is attached to the upstanding end of the carriage base 10 by hex nuts 151 and 152 respectively, which end of the base is forming the head load stop 101. On the other end spaced apart from the hex nuts, the bearing block 14 is provided with a sloping surface as to permit the movement of the hinge spring 134 when the head support arm 13 is lifted into its unloaded position. At this end the bearing block 14 is also provided with a socket 141 forming bearings for a pin 142.

This pin 142 forms a pivot for an auxiliary load arm 16 extending essentially in parallel to the head support arm 13. The auxiliary load arm 16 is a flat, low mass cantilever. Adjacent to its mounted end, the arm 16 is provided with a pair of elongated side arms 161 bent at right angles to the plane surface.

These side arms 161 are pivotally mounted in respect to the bearing block 14 on the pin 142. Adjacent to the pin 142 the auxiliary load arm 16 is also provided with a trough-shaped center portion 162 which is extending in a longitudinal direction. Furthermore, the pin 142 forms the bearing for a torsional load spring 17, the short end of this spring 17 being attached to the bearing block 14. The other, elongated, linear end is running longitudinally against the trough-shaped center portion 162 of the auxiliary load arm 16.

At the free end of the auxiliary load arm 16, spaced apart from bearing block 14, the arm 16 is provided with a knob 163 facing to the head shield 132 and forming a head load fulcrum. In addition, the auxiliary load arm 16 is provided with a lift tab 164 formed of a rectangular elongated portion of the free end of the load arm 16 adjacent to the control tab 132 of the head support arm 13.

Furthermore, a cantilever residual leaf spring 18 facing to the head support arm is mounted to the auxiliary load arm by two rivets. The free end of this residual spring 18 extends to the upper surface of the head support arm, and is held there by fingers 136. These fingers stand off to both sides of the thinned central section 131 of the head support arm 13.

During operations of a magnetic storage device using the described head load carriage assembly the recording medium has to be inserted or ejected, respectively. To permit this operation the head support arm 13 has to be lifted. This is accomplished by lifting the control tab 133 and holding it in an unloaded position. In this position the upper magnetic head 12 is spaced apart from the fixed lower magnetic head 11, so the recording medium can be inserted between them or can be ejected from an operative position without damaging the surface of the magnetic heads or the recording medium itself. For settling the upper magnetic head toward the surface of an inserted recording medium, the control tab 133 is released. Due to the spring forces of the pivot hinge spring 134 and the torsional load spring 17 the head support arm 13 and the auxiliary load arm 16 are released.

This position wherein both the head support arm 13 and the auxiliary load arm 16 are released may be designated the first load position. The spring forces of the biased hinge spring 134 and the torsional load spring 17 are dimensioned such that the pressure of the auxiliary load arm 16 onto the head shield 132, and therefore, of upper magnetic head onto the recording medium, is in a range of 10 to 20 g, and preferably about 16 g. As is known in the art, this is a suitable magnetic head pressure to perform contact read/write operations. However, this pressure would be too high in a non-operative mode. In such a mode, if the magnetic head remained in an idling position with respect to one of the tracks of the recording medium undue wear would result. In the device described above, however, the lift tab 164 of the auxiliary load arm 16 is engaged by second lifting control means 192 such as an energized solenoid in the non-operative mode of the magnetic heads. The auxiliary load arm 16 is thus lifted by the control means from its first load position into the second load position. In this position the auxiliary load arm 16 is spaced apart at its free end from the head support arm 13. In this position the torsional load spring 17 is out of effect. However, the residual load spring 18 is still engaging the thinned central section 131 of the head support arm 13. The residual spring 18 is so dimensioned as to hold the upper magnetic head 12 in contact with the recording medium with a low force in a range of 1 to 5 g, preferably about 3 g.

Comparing the resulting pressures of the upper magnetic head 12 onto the recording medium in both load positions, it can be seen that the function of the auxiliary load arm 16 allows both a secure contact during read/write operations and a minimum contact in non-operative mode. By this lesser force in the second load position undue wear of the recording medium is avoided, and the sliding of the upper magnetic head on the recording medium is assured by resisting any of the reverse bias forces induced by the hinge spring 134 or a head cable. This improvement avoids the disadvantage of lifting the magnetic head from the recording medium during non-operative mode which results in longer access time.

It is of course significant that the assembly disclosed is compatible with the structures of prior art devices. This feature is attained because of the embodiment of the auxiliary load arm. The required spaces for the auxiliary load arm and the attached residual leaf spring are very small. Furthermore, there are only small changes in the structure of the bearing block necessary for pivotally mounting the auxiliary load arm. The necessary energizing means for lifting the auxiliary load arm from the first load position to the second load position are very well known with floppy disk storage devices and often used; therefore, any additional control mechanism is not inconvenient in respect to the compatibility. On the other hand, the improvement disclosed solves the problem of short accessing times in a system with high reliability. It is to be understood that the improvement disclosed is very useful also with other kinds of floppy disk storage devices than the described device with double sided recordings.

While the form of the carriage assembly herein described constitutes a preferred embodiment of the invention it is to be understood that the invention is not limited to this precise form of assembly, and that a variety of changes may be made therein without departing from the scope of the invention.

We claim:

1. A head loading carriage assembly for a data storage device for use with a flexible, rotatable magnetic recording medium, said carriage assembly having a base and being movable in a radial direction relative to the recording medium, and said carriage assembly comprising, in combination:
    (a) a head support arm pivoted with respect to said base and movable in a direction normal to the plane of the recording medium, said support arm carrying at least one magnetic head;
    (b) an auxiliary load arm pivoted with respect to said base and movable in a direction normal to the plane of the recording medium toward and away from said support arm between a first load position in which the magnetic head contacting the plane of said medium is in an operative relationship with said medium for performing read/write operations and a second load position in which the magnetic head, still in contact with said medium, is idling along a track of said medium in a nonoperative relationship, said auxiliary arm being movable from the first load position into the second load position;
    (c) first spring means urging the auxiliary load arm into the first load position towards said support arm, as to engage the magnetic head attached to said support arm with said medium; and
    (d) second spring means arranged between said support arm and said auxiliary load arm and operative in the second load position of the auxiliary load arm to apply a force to said support arm which is less than that of said auxiliary load arm in its first load position, whereby said magnetic head remains in contact with the recording medium when in an operative as well as nonoperative relationship therewith.

2. The carriage assembly according to claim 1 wherein in the first load position the auxiliary load arm is aligned essentially in parallel with the head support arm.

3. The carriage assembly according to claim 2 wherein said first spring means is a helical torsion spring.

4. The carriage assembly according to claim 1 wherein a head load fulcrum is located between the head support arm and the auxiliary load arm.

5. The carriage assembly according to claim 4 wherein said head load fulcrum is formed by contact elements on adjacent surfaces of said auxiliary load arm and the head support arm, respectively.

6. The carriage assembly according to claim 5 where one contact element is a protuberance and the other contact element is a pad, the protuberance and the pad being engaged with each other in the first load position and being spaced from each other in the second load position.

7. The carriage assembly according to claim 1 wherein said second spring means is a residual leaf spring.

8. The carriage assembly according to claim 7 wherein said leaf spring is cantilevered and located between the head support arm and the auxiliary load arm.

9. The carriage assembly according to claim 8 wherein one end of said leaf spring is attached to the auxiliary load arm and the other end of said leaf spring abuts the surface of the head support arm.

10. The carriage assembly according to claim 1 wherein the first and second spring means are dimensioned such that they apply to the magnetic head in the first load position of said auxiliary load arm a force in the range of 10 to 20 g and in the second load position a force in the range of 1 to 5 g.

11. The carriage assembly according to claim 1 wherein the head support arm comprises a solid portion and a flexible portion in the form of a leaf spring, said flexible portion being attached to said carriage base and forming a hinge.

12. The carriage assembly according to claim 1, further comprising:
 (a) first control means for selectively lifting said head support arm away from said plane against the force of said spring means; and
 (b) second control means for lifting said auxiliary load arm from said first to said second load position against the force of said first spring means during idling of said magnetic head along a track of said medium.

* * * * *